United States Patent [19]

Fogg

[11] 4,080,987
[45] Mar. 28, 1978

[54] HYDRAULIC SAFETY VALVE

[75] Inventor: Daniel A. Fogg, Fremont, Mich.

[73] Assignee: Gerber Products Company, Fremont, Mich.

[21] Appl. No.: 668,889

[22] Filed: Mar. 22, 1976

[51] Int. Cl.² .............................................. F16K 17/00
[52] U.S. Cl. .................................. 137/464; 137/514.3; 137/514.5
[58] Field of Search .................... 137/464, 514.3, 514.5

[56] References Cited

U.S. PATENT DOCUMENTS

| 1,312,644 | 8/1919  | Dundon ................................. 137/464 |
| 2,765,801 | 10/1956 | Selim ..................................... 137/464 |
| 2,809,657 | 10/1957 | Stephenson ........................... 137/464 |
| 2,851,056 | 9/1958  | MacGlashan ......................... 137/464 |
| 2,941,629 | 6/1960  | Rohacs ........................... 137/514.5 X |
| 3,038,557 | 6/1962  | Callahan ........................... 137/464 X |
| 3,971,404 | 7/1976  | Quarve ................................. 137/464 |

*Primary Examiner*—Harold W. Weakley
*Attorney, Agent, or Firm*—Townsend and Townsend

[57] ABSTRACT

A hydraulic safety valve is disclosed which is operative to automatically block a liquid fluid path upon the loss of fluid pressure and to maintain the fluid path in a blocked condition until manually reset. The valve comprises a cylinder, a piston disposed within the cylinder defining multiple spool gates for selectively blocking a valve aperture in the side of the cylinder and for dividing the cylinder into at least a main chamber and a variable volume balancing chamber at one end of the piston. A relatively short fluid path conduit is provided between the balancing chamber and the main chamber. A manually actuable plunger axially aligned with the piston is provided for urging the piston into a valve open position. A biasing means is provided for urging the piston into a valve closed position. In operation the valve is maintained in an open position by downstream back pressure directly through the relatively short pilot fluid conduit coupling the main chamber with the variable volume balancing chamber. The smallest volume of the balancing chamber is at the valve closed position.

2 Claims, 2 Drawing Figures

U.S. Patent  March 28, 1978  4,080,987
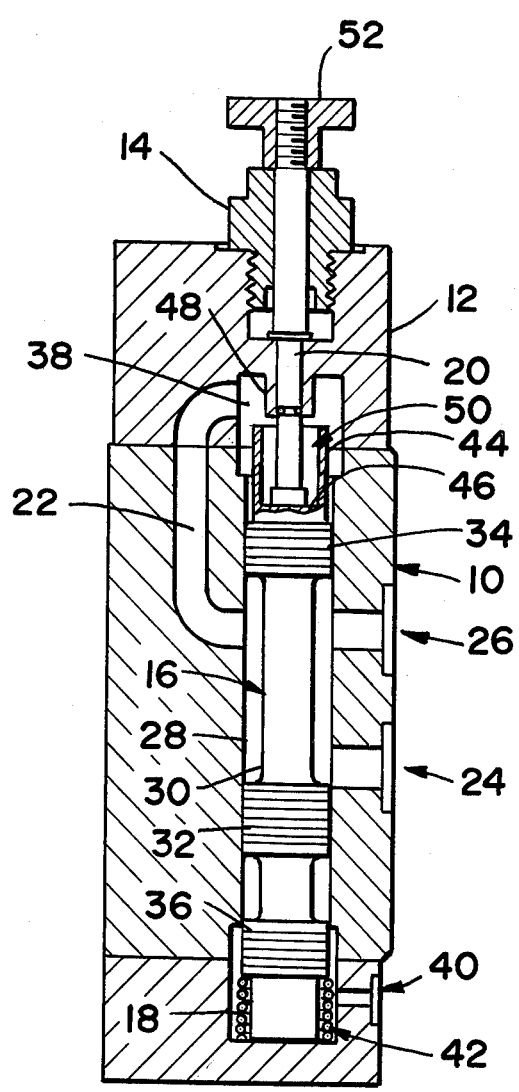
FIG_1
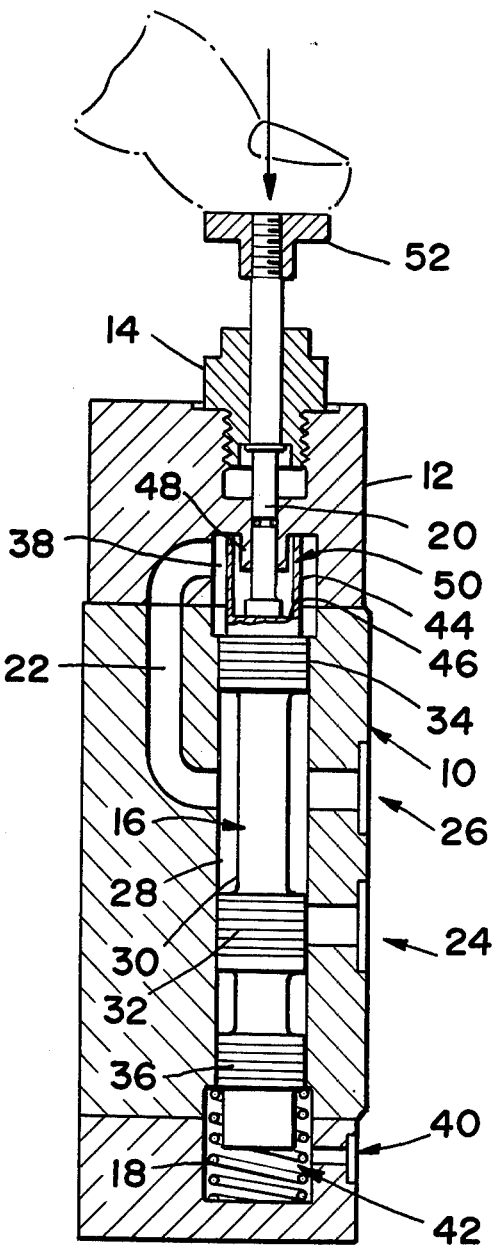
FIG_2

HYDRAULIC SAFETY VALVE

BACKGROUND OF THE INVENTION

1. Field of the Invention

This invention relates to automatic stop valves and particularly to pilot controlled automatic stop valves with manual reset for operation in liquid fluid environments such as hydraulic control systems.

In hydraulic control system operation, breakage or failure of an element in the fluid line, such as a conduit or a pump, may cause injury or damage if not promptly controlled. For example, fluid may be lost or may cause damage if not contained. Moreover, hydraulically controlled machinery may immediately become erratic threatening damage to equipment and injury to workers. A particular danger exists if fluid pressure is unexpectedly restored during maintenance or attempted operation. Absent adequate safety mechanisms, the hydraulic system may be actuated in an undesired mode which may also cause injury and damage. It is therefore desirable to provide adequate safety precautions to guard against damage to fluid systems and equipment and injury to workers.

2. Description of the Prior Art

Remote controlled shut-off valves are well known, particularly in pneumatic systems. Generally such valves include a diaphram separating chambers across which a pressure level may be monitored. If fluid pressure deviates outside preselected lower or upper limits, system operation is automatically terminated. Remote valve control permits valves to be reset to restore system operation.

Manually resettable pilot control valves are also known to the art. For example, U.S. Pat. No. 3,661,173 describes a control valve in which downstream back pressure is employed to balance the upstream pressure, the upstream pressure being employed to maintain a valve gate in an open position. The valve therein disclosed includes a flexible membrane defining a portion of the wall of a balancing chamber. Such membranes or diaphrams appear to be a common expedient in pilot controlled valves. Valves of the exemplary configuration are subject to failure due to the fatigue and possible breakdown of the membrane. The exemplary valve also appears to disclose a balancing chamber preferably of a constant volume separated by a significant fluid path distance from the valve aperture. Such features appear to be superfluous expedients in many applications.

SUMMARY OF THE INVENTION

A hydraulic safety valve is disclosed which is operative to automatically block a liquid fluid path upon the loss of fluid pressure and to maintain the fluid path in a blocked condition until manually reset. The valve comprises a cylinder, a piston disposed within the cylinder defining multiple spool gates for selectively blocking a valve aperture in the side of the cylinder and for dividing the cylinder into at least a main chamber and a variable volume balancing chamber at one end of the piston. A relatively short fluid path conduit is provided between the balancing chamber and the main chamber. A manually actuable plunger axially aligned with the piston is provided for urging the piston into a valve open position. A biasing means is provided for urging the piston into a valve closed position. In operation the valve is maintained in an open position by downstream back pressure directly through the relatively short pilot fluid conduit coupling the main chamber with the variable volume balancing chamber. The smallest volume of the balancing chamber is at the valve closed position.

BRIEF DESCRIPTION OF THE DRAWINGS

The invention will be best understood by reference to the following detailed description in conjunction with the accompanying illustrations in which:

FIG. 1 is a cross-sectional view of a preferred embodiment of the valve according to the invention in an open and operational condition; and FIG. 2 is a cross-sectional view of the embodiment of FIG. 1 in the closed position, also indicating the manual reset feature.

DETAILED DESCRIPTION OF SPECIFIC EMBODIMENTS

FIGS. 1 and 2 show a safety valve comprising essentially a body 10, a head 12, a bushing cap 14, a piston 16, a bias spring 18, a plunger 20, and a pilot conduit 22.

A body 10, which may be generally cylindrical, includes an inlet or pressure port 24 and an outlet or work port 26, a cylindrical main chamber 28 coupling the inlet port 24 and the outlet port 26 which access the side of the cylindrical main chamber 28. The piston 16 is slidably displaceable within the main chamber 28 and includes a stem 30 having a diameter smaller than the diameter of the main chamber 28 and a spool gate 32 conforming to the circumference of the main chamber 28. The spool gate 32 is provided in a position for blocking the inlet port 24 upon translation of the piston 16.

The piston 16 may further include a first spool seal 34 adjacent one end of the stem 30 and a second spool seal 36 adjacent the opposing stem end.

The pilot conduit 22 couples the main chamber 28 with a variable volume balancing chamber 38 adjacent one end of the piston 16. The pilot conduit 22 is operative to maintain constant fluid communication between the main chamber 28 and the balancing chamber 38. The conduit 22 may be relatively short and preferably is formed by a part of the valve body 10. A spool seal, for example, the first spool seal 34, separates the main chamber 28 from the balancing chamber 38 and operates to vary the volume of the balancing chamber 38 in response to the piston 16 position.

The biasing spring 18, or other bias means, is operative to urge the piston 16 into a position blocking the inlet port 24. For example, FIG. 2 shows the spool gate 32 blocking the inlet port 24 under the urging of the bias spring 18. Additionally, a pilot or drain port 40 may be provided permitting either external variable pilot biasing through a bias chamber 42 adjacent the second spool seal 36 or at least pressure relief upon movement of the piston 16 displacing the spring 18.

The piston 16 includes a cup 44 having an enclosed face 46 disposed to receive pressure opposing the valve biasing. The balancing chamber 38 further includes a neck 48 which is disposed to fit into the mouth of the cup 44 thereby partially blocking the opposed face 46 (FIG. 2). The cup 44 and neck 48 comprise a dashpot 50 for damping piston 16 movement closing the inlet port 24. The cup 44 and neck 48 may also cooperate to seal a portion of the piston 16 and against bias spring opposing fluid pressure force within the balancing chamber 38.

The plunger 20 is disposed with one end confronting the valve face 46 in the balancing chamber 38 and with the opposite end accessible external of the valve body 10. The external end may be provided with a button 52 for convenient manual actuation. The bushing cap 14 serves as a plunger guide and stop.

Although the operation of the safety valve may be apparent from the foregoing illustrations and description, a brief summary of the operation may be helpful in understanding the invention. In the normal or inlet port open operating condition (FIG. 1), hydraulic pressure is received through the inlet port 24 and exhausted through the outlet port 26. The pilot conduit 22, which may be either internal or external of the valve body 10, couples pressurized fluid between the main chamber 28 and the balancing chamber 38, equalizing the pressure on the valve face 46 and both sides of the first spool seal 34 only if back pressure is sufficient to overcome the spring bias force. Pressure on the balancing chamber 38 is typically sufficient to overcome the biasing pressure of the biasing spring 18 under normal operating conditions. Thus, the valve is maintained in an open condition so long as adequate pressure is provided in the main chamber 28 and the balancing chamber 38.

If an accident occurs causing an unexpected loss of fluid pressure either upstream of the inlet port 24 or downstream of the outlet port 26, back pressure is reduced and pressure is lost in the main chamber 28 and in the balancing chamber 38. In the absence of this fluid pressure, the biasing spring urges the piston 16 toward the balancing chamber 38, thereby translating the spool gate 32 to a position blocking the inlet port 24. The dashpot 50 dampens the impact of the moving piston 16. In the closed position, the cup 44 encloses the neck 48, thereby blocking the valve face 46 to prevent sudden back pressure downstream of the outlet port 26 from inadvertently opening the spool gate 32. In the closed condition (FIG. 2) fluid flow through the safety valve is prevented.

Once the problem causing the valve closure has been cleared and equipment has been checked to the satisfaction of the system operator, the valve may be manually reset to the open position by depression of the plunger button 52. It should be understood that the plunger 20 may be operated either manually or by remotely actuable solenoid means (not shown).

Depressing the plunger 20 urges the piston 16 in compression against the bias spring 18 and opening the inlet port 24. If sufficient fluid pressure is restored to the main chamber 28 and the balancing chamber 38, the plunger 20 may be released and the valve will remain in an open condition. Otherwise, the valve will reclose under the urging of the bias spring 18.

An invention has been described with reference to specific embodiments. Modifications may be made to the embodiments herein described without departing from the scope of the invention. Therefore, it is not intended that the invention be limited except as circumscribed by the appended claims.

What is claimed is:

1. A hydraulic safety valve comprising:
   a body defining a straight hollow cylindrical chamber having an inlet port and an outlet port in the side wall thereof;
   piston means having a spool gate conforming to and slidably sealing the inner side wall of said cylindrical chamber and translatable in response to piston movement for selectively blocking and unblocking said inlet port;
   said piston means further including a spool seal adjacent a first end thereof slidably sealing said inner chamber wall, defining a fixed volume main chamber between said spool gate and said spool seal, and a variable volume auxiliary chamber adjacent said first end, said piston means being responsive to force on said first end; bias means operative upon a second end of said piston means opposing force or said first end for urging said spool gate to an inlet port blocking position;
   said auxiliary chamber including a dashpot means for damping the movement of said piston means in response to movement of said spool gate means toward said inlet port; wherein
   said dashpot means is further operative to block a portion of said piston means first end from encountering fluid pressure directed to oppose said bias means at said inlet port blocking position;
   a pilot conduit coupling with main chamber downstream of said fluid inlet port with said auxiliary chamber for providing constant fluid communication therebetween; and
   plunger means operative to engage said first piston end for urging said spool gate to an inlet port unblocking position.

2. A hydraulic safety valve according to claim 1, wherein said bias means comprises a compressible coil spring engaging said piston means second end.

* * * * *